(12) United States Patent
Mori et al.

(10) Patent No.: US 7,796,840 B2
(45) Date of Patent: Sep. 14, 2010

(54) IMAGE PROCESSING APPARATUS AND METHOD THEREOF

(75) Inventors: Katsuhiko Mori, Kawasaki (JP); Masami Kato, Sagamihara (JP); Hiroshi Sato, Kawasaki (JP); Yusuke Mitarai, Ohta (JP)

(73) Assignee: Canon Kabushiki Kaisha, Tokyo (JP)

( * ) Notice: Subject to any disclaimer, the term of this patent is extended or adjusted under 35 U.S.C. 154(b) by 1049 days.

(21) Appl. No.: 11/469,115

(22) Filed: Aug. 31, 2006

(65) Prior Publication Data

US 2007/0053614 A1    Mar. 8, 2007

(30) Foreign Application Priority Data

Sep. 5, 2005    (JP) .............................. 2005-256859

(51) Int. Cl.
  *G06K 9/00*    (2006.01)
  *G06K 9/32*    (2006.01)
(52) U.S. Cl. ...................................... 382/298; 382/118
(58) Field of Classification Search ................. 382/118, 382/298
   See application file for complete search history.

(56) References Cited

U.S. PATENT DOCUMENTS

| | | | |
|---|---|---|---|
| 5,715,325 A * | 2/1998 | Bang et al. .................. | 382/118 |
| 6,526,156 B1 * | 2/2003 | Black et al. .................. | 382/103 |
| 6,633,655 B1 * | 10/2003 | Hong et al. .................. | 382/118 |
| 6,967,687 B1 | 11/2005 | Suga | |
| 7,356,204 B2 * | 4/2008 | Takahashi ................... | 382/309 |
| 7,428,066 B2 | 9/2008 | Shinomiya et al. | |
| 2004/0151376 A1 | 8/2004 | Nomura et al. | |
| 2004/0207655 A1 | 10/2004 | Kang | |
| 2005/0128307 A1 | 6/2005 | Kobayashi et al. | |

FOREIGN PATENT DOCUMENTS

| | | |
|---|---|---|
| CN | 1186274 | 7/1998 |
| CN | 1523874 | 8/2004 |
| CN | 1627814 | 6/2005 |
| JP | 04-291127 A | 10/1992 |
| JP | 3164692 | 3/2001 |
| JP | 2001-309225 | 11/2001 |
| JP | 2003-025695 A | 1/2003 |

(Continued)

OTHER PUBLICATIONS

Chinese Office Action datd Nov. 9, 2007 concerning Chinese Patent Application 2006101276739 with English translation.

(Continued)

*Primary Examiner*—Bhavesh M Mehta
*Assistant Examiner*—Hadi Akhavannik
(74) *Attorney, Agent, or Firm*—Canon U.S.A., Inc. I.P. Division

(57) ABSTRACT

An image processing apparatus having an image sensing unit and a subject detection unit for performing a process of detecting a subject in an image inputted from said image sensing unit, has a detection size operation unit that sets a resolution of a target object to be detected by the subject detection unit, and an image conversion unit that converts a resolution of the input image, based on the resolution of the target object set by the detection size operation unit. The subject detection unit performs the process of detecting the subject in the image whose resolution has been converted by the image conversion unit.

17 Claims, 15 Drawing Sheets

FOREIGN PATENT DOCUMENTS

| | | |
|---|---|---|
| JP | 2003-107555 | 4/2003 |
| JP | 2004-240622 A | 8/2004 |

OTHER PUBLICATIONS

Viola et al, "Rapid Object Detection Using a Boosted Cascade of Simple Features", Proc. of IEEE Conf. CVPR, 1, pp. 511-518, 2001.

Matsugu, et al, "Convolutional Spiking Neural Network Model for Robust Face Detection", International Conference on Neural Information Procerssing (ICONIP02), 2002.

Rowley, et al., "Neural Network-Based Face Detection", Computer Vision and Pattern Recognition (CVPR'96), pp. 203-208, 1996.

* cited by examiner

IMAGE PROCESSING APPARATUS AND METHOD THEREOF

BACKGROUND OF THE INVENTION

1. Field of the Invention

The present invention relates to an image processing apparatus and a method thereof, and more particularly to an image processing apparatus and a method thereof for detecting a predetermined target object (subject) from an image inputted from an image input device such as a digital camera or the like.

2. Description of the Related Art

Conventionally, a digital camera or a digital video for detecting a specific subject such as an individual or a face in an input image and performing a process which is suitable for the detected subject, has been proposed.

In Japanese Patent No. 3164692, a camera has been proposed which includes an individual recognition unit for recognizing that a subject is an individual, and a distance detection unit for detecting a distance to the subject. This camera includes a unit for adjusting a focal length, a focal position and an aperture based on the detected distance to the subject, and controlling an entire face of the individual to be approximately within a depth of field.

In Japanese Patent Application Laid-Open No. 2001-309225, a camera has been proposed which detects more than one face of persons included in an image in order to improve the quality of the image.

In Japanese Patent Application Laid-Open No. 2003-107555, an image sensing apparatus has been proposed which has a face detection unit for detecting a face of an individual from image data, and controls an exposure based on a result of the detection. This image sensing apparatus includes a photometry unit for performing photometry with respect to a photometry area which is set to the individual's face detected by the face detection unit, and an exposure control unit for calculating an exposure amount based on a result of the photometry of the individual's face and performing an exposure control based on the calculated exposure amount.

As a face detection processing method for detecting the face in the image, various methods have been proposed. For example, in "Rapid object Detection using a Boosted Cascade of Simple Features", P. Viola, M. Jones, Proc. of IEEE Conf. CVPR, 1, pp. 511-518, 2001, a high speed face detection method has been proposed. Moreover, in "Convolutional Spiking Neural Network Model for Robust Face Detection", M. Matsugu, K. Mori, et. al, 2002, International Conference On Neural Information Processing (ICONIP02) and "Neural Network-Based Face Detection", H. A. Rowley, S. Baluja, T. Kanade, 1996, Computer Vision and Pattern Recognition (CVPR '96), neural networks for performing a face detection have been proposed.

In the case of sensing the image with a digital camera, where, how large and how many faces exist in the image vary substantially depending on a sensing condition. Thus, it is required that the face detection processing method mounted on the digital camera does not depend on a position, the size or the number of faces in the image.

A basic concept of detecting a specific pattern such as the face or the like (hereinafter referred to as "detection pattern") from the image is as follows. First, an area of a specific size is clipped from the image, a feature of the area and a feature of the detection pattern are compared and investigated. If those features are similar, it is determined that the clipped area is the detection pattern and the specific pattern such as the face or the like exists in the area.

Thus, as shown in FIG. 14, by clipping the area of a specific size sequentially from an image 1401 and investigating those clipped areas respectively, it is possible to perform a detection independent of the position and the number of faces in the input image. Moreover, in order to perform a detection independent of the size of a face, as shown in FIG. 15, a plurality of images obtained by converting a resolution of the input image discretely, called pyramid images, are prepared, and the areas are clipped and investigated from the images of respective resolutions.

Moreover, it is also possible to prepare a plurality of types of detection patterns of specific different sizes and perform the detection, without performing the resolution conversion with respect to the image.

A clipping position, each displacement, that is to say, a positional interval due to the resolution conversion, and an interval of the resolutions depend on positional robustness and size robustness of each detection method. For example, in the case where the pattern detection is performed with respect to one clipped area and the detection pattern is not detected unless the detection pattern exists in the center of the area, it is necessary to move the clipping position pixel by pixel. Here, if the method has the positional robustness of ±2 pixels, it is possible to move the clipping position by 5 pixels. In other words, it is possible to reduce the amount of calculation. Also, similarly, in terms of the size, in a detection method having double size robustness with respect to one area, if images of two resolutions of 1/1 times and 1/2 times are prepared, it is possible to accept a quadruple size variation. On the other hand, in a detection method having the size robustness of about 1.4 times, it is necessary to prepare the images of four resolutions of 1/1 times, $1/\sqrt{2}$ times, 1/2 times and $1/(2\sqrt{2})$ times and the calculation amount increases.

Generally, however, if the robustness is raised, detection precision tends to be reduced. In other words, even when the detection pattern such as the face or the like exists in the image, the detection pattern may not be detected, or a pattern such as a background or the like which is completely different from the detection pattern may be detected incorrectly as the detection pattern. If such a detection error occurs, when the exposure is controlled in accordance with the face in the image as proposed in Japanese Patent Application Laid-Open No. 2003-107555, the exposure may be controlled in accordance with the area other than the face which has been incorrectly detected, for example, the background or the like.

Conversely, if the robustness is reduced, it is necessary to thicken a clipping positional interval and the interval of the resolutions, and the calculation amount increases in this case. When the calculation amount increases, it may take time to perform the detection process with respect to the image.

SUMMARY OF THE INVENTION

The present invention has been made in consideration of the above situation, and has as its object to facilitate a setting for performing a detection with a detection performance which is necessary and enough for the user, in detecting a specific pattern in a image.

According to the present invention, the foregoing object is attained by providing an image processing apparatus having an image input unit and a detection unit for performing a process of detecting a predetermined target object in an image inputted from the image input unit, comprising: a size changing unit that sets a resolution of the target object to be detected by the detection unit; and a resolution conversion unit that converts a resolution of the input image based on the resolution of the target object set by the size changing unit, wherein the detection unit performs the process of detecting the target object in the image whose resolution has been converted by the resolution conversion unit.

According to the present invention, the foregoing object is also attained by providing an image processing method comprising: an image input step; a detection step of performing a process of detecting a predetermined target object in an image inputted at the image input step; a size changing step of setting a resolution of the target object to be detected at the detection step; and a resolution conversion step of converting a resolution of the input image, based on the resolution of the target object set at the size changing step, wherein the detection step performs the process of detecting the target object in the image whose resolution has been converted at the resolution conversion step.

According to another aspect of the present invention, the foregoing object is also attained by providing an image processing apparatus having an image input unit and a detection unit for performing a process of detecting a predetermined target object in an image inputted from the image input unit, comprising: a size changing unit that sets a size of the target object to be detected by the detection unit; a processing time acquisition unit that acquires a predicted processing time which is required for detecting the target object by the detection unit, based on the size of the target object set by the size changing unit; and a notification unit that notifies the predicted processing time acquired by the processing time acquisition unit.

Furthermore, the foregoing object is also attained by providing An image processing method comprising: an image input step; a detection step of performing a process of detecting a predetermined target object in an image inputted at the image input step; a size changing step of setting a size of the target object to be detected at the detection step; a processing time acquisition step of acquiring a predicted processing time which is required for detecting the target object at the detection step, based on the size of the target object set at the size changing step; and a notification step of notifying the predicted processing time acquired at the processing time acquisition step.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE EMBODIMENTS

Preferred embodiments of the present invention will be described in detail in accordance with the accompanying drawings. However, the dimensions, shapes and relative positions of the constituent parts shown in the embodiments should be changed as convenient depending on various conditions and on the structure of the apparatus adapted to the invention, and the invention is not limited to the embodiments described herein.

First Embodiment

Figure 1:
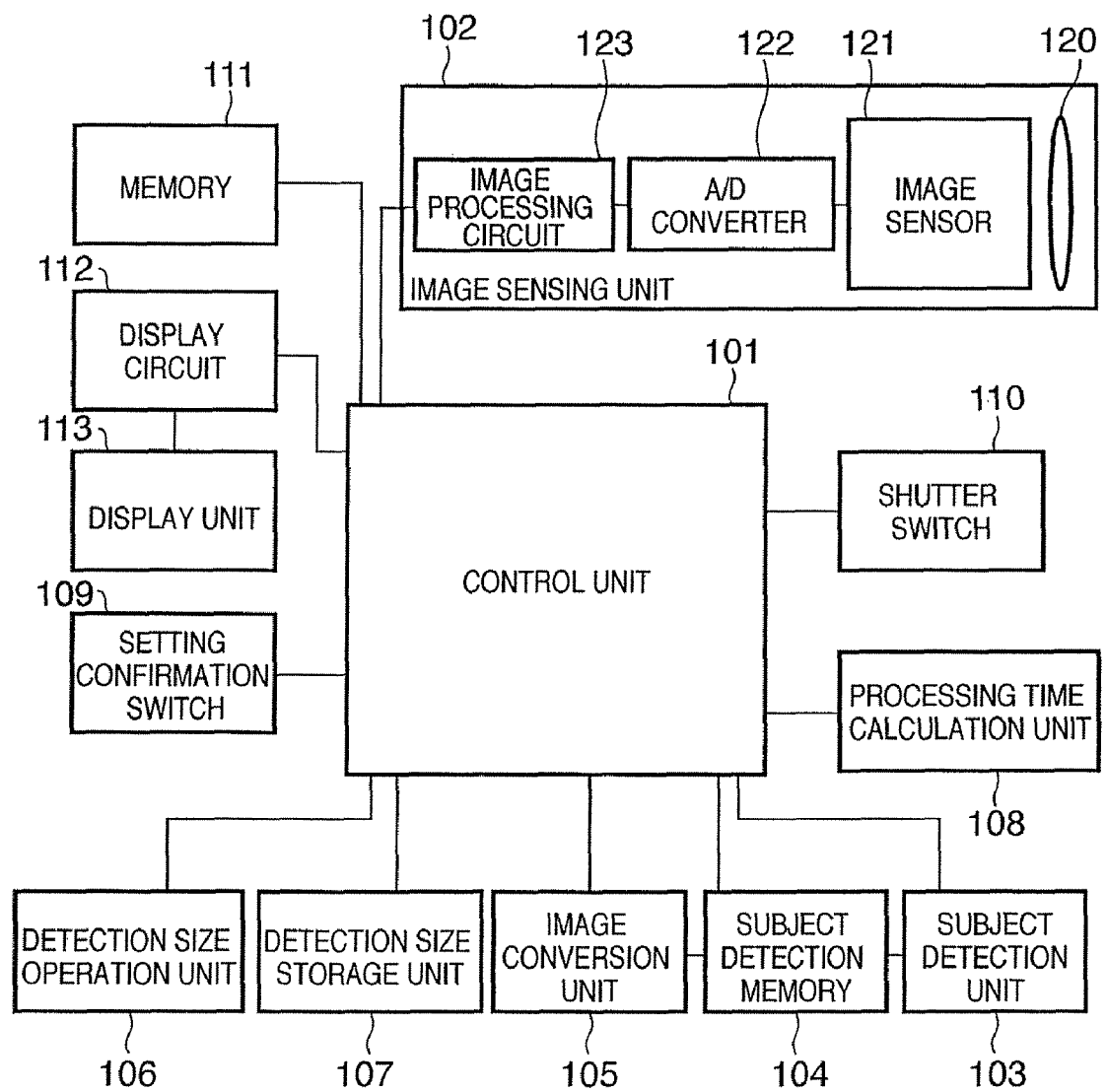
FIG. 1 is a block diagram showing a schematic functional configuration of an image sensing apparatus according to a first embodiment of the present invention.

FIG. 1 is a diagram showing a configuration of an image sensing apparatus according to the first embodiment. In FIG. 1, reference numeral 101 denotes a control unit; 102, an image sensing unit; 103, a subject detection unit; 104, a subject detection memory; 105, an image conversion unit; 106, a detection size operation unit; 107, a detection size storage unit; 108, a processing time calculation unit; 109, a setting confirmation switch; 110, a shutter switch; 111, a memory; 112, a display circuit; and 113, a display unit.

The control unit 101 is a unit for controlling the entire image sensing apparatus. To the control unit 101, the image sensing unit 102, the subject detection unit 103, the subject detection memory 104, the image conversion unit 105, the detection size operation unit 106, the detection size storage unit 107, the processing time calculation unit 108, the setting confirmation switch 109, the shutter switch 110, the memory 111, and the display circuit 112 are connected. The control unit 101 controls so that each unit operates at an appropriate timing.

The image sensing unit 102 comprises an image sensing lens 120, an image sensor 121 for converting a subject optical image which has passed through the image sensing lens 120 into an analog electrical signal, an A/D converter 122 for converting the converted analog electrical signal into a digital signal, and an image processing circuit 123. The image processing circuit 123 creates an appropriate image signal by performing a predetermined processes, such as a white balance correction, a gamma conversion or the like, on the digital signal obtained by the A/D conversion performed by the A/D converter 122. It should be noted that the image sensing unit 102 performs an image sensing process based on a control signal from the control unit 101.

The memory 111 stores programs for the control unit 101 and data used for control. Moreover, the memory 111 also stores an image sensed by the image sensing unit 102.

The detection size operation unit 106 sets a resolution (hereinafter referred to as "detection size") of a specific pattern (subject) that is a detection object, with respect to a resolution of an input image, in a detection process by the subject detection unit 103. The detection size storage unit 107 stores this detection size.

The image conversion unit 105 converts the resolution of an image sensed by the image sensing unit 102 so that it may become a resolution at which the subject of the detection size stored in the detection size storage unit 107 can be detected, as will be described below. The image whose resolution has been converted by the image conversion unit 105 is stored in the subject detection memory 104. The subject detection unit 103 performs the detection process of detecting the subject on the resolution-converted image stored in the subject detection memory 104.

The processing time calculation unit 108 calculates an approximate processing time related to the detection process performed by the subject detection unit 103, based on the detection size set by the detection size operation unit 106.

The setting confirmation switch 109 is a switch for switching to display intelligibly the detection size stored in the detection size storage unit 107. If the setting confirmation switch 109 is On, a frame of the size and the subject of CG (Computer Graphics) as will be described below are displayed in a superimposed manner. If the setting confirmation switch 109 is Off, these are not displayed.

The display circuit 112 controls the display unit 113 to perform a desired screen display. Displayed on the display unit 113 is information useful for the image sensing, such as the image sensed by the image sensing unit 102, the image stored in the memory 111, the subject detected by the subject detection unit 103, the detection size stored in the detection size storage unit 107, and the like.

Figure 3:
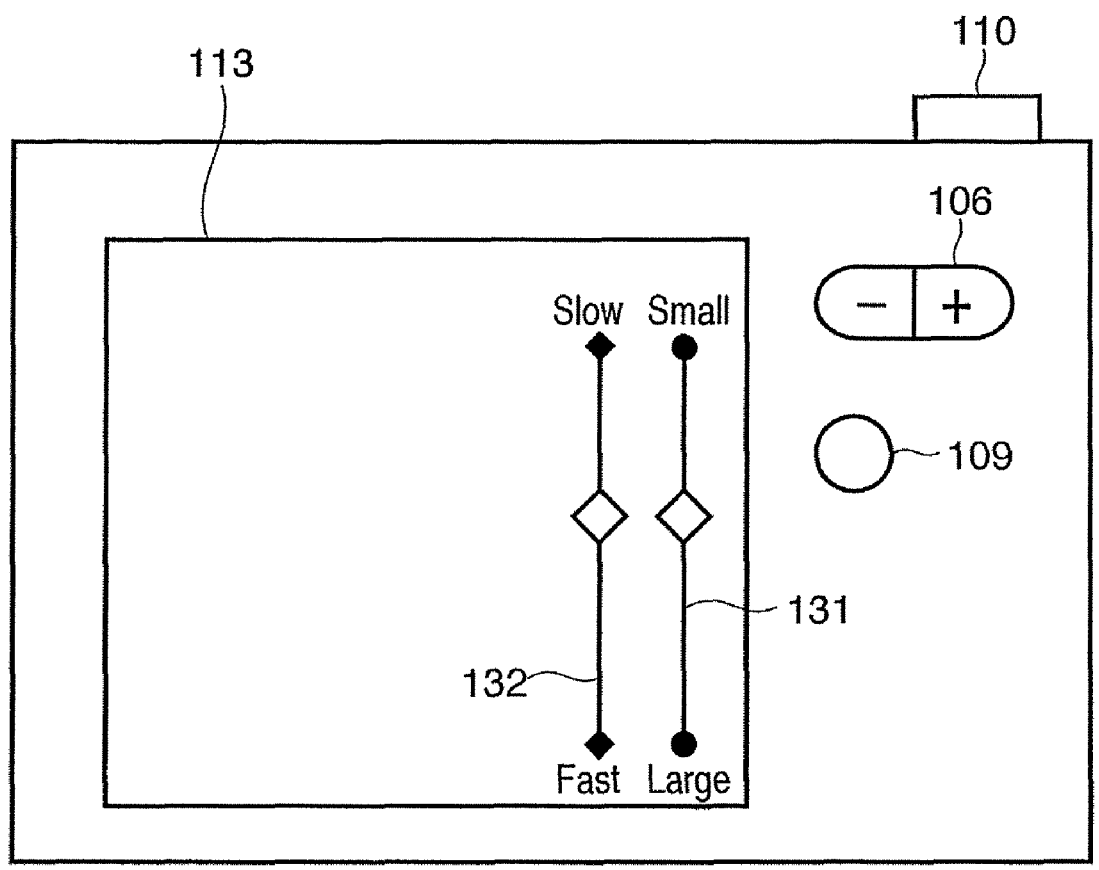
FIG. 3 is a rear view of the image sensing apparatus according to the first embodiment of the present invention.

FIG. 3 shows an example of a rear side of the image sensing apparatus according to the first embodiment. In FIG. 3, reference numeral 131 denotes a detection size display bar, and reference numeral 132 denotes a processing time display bar. Those bars are displayed within the display unit 113.

The detection size display bar 131 displays the detection size stored in the detection size storage unit 107. Moreover, the processing time display bar 132 displays the approximate processing time obtained by the processing time calculation unit 108 based on the detection size stored in the detection size storage unit 107. This calculation method will be described below.

Figure 2:
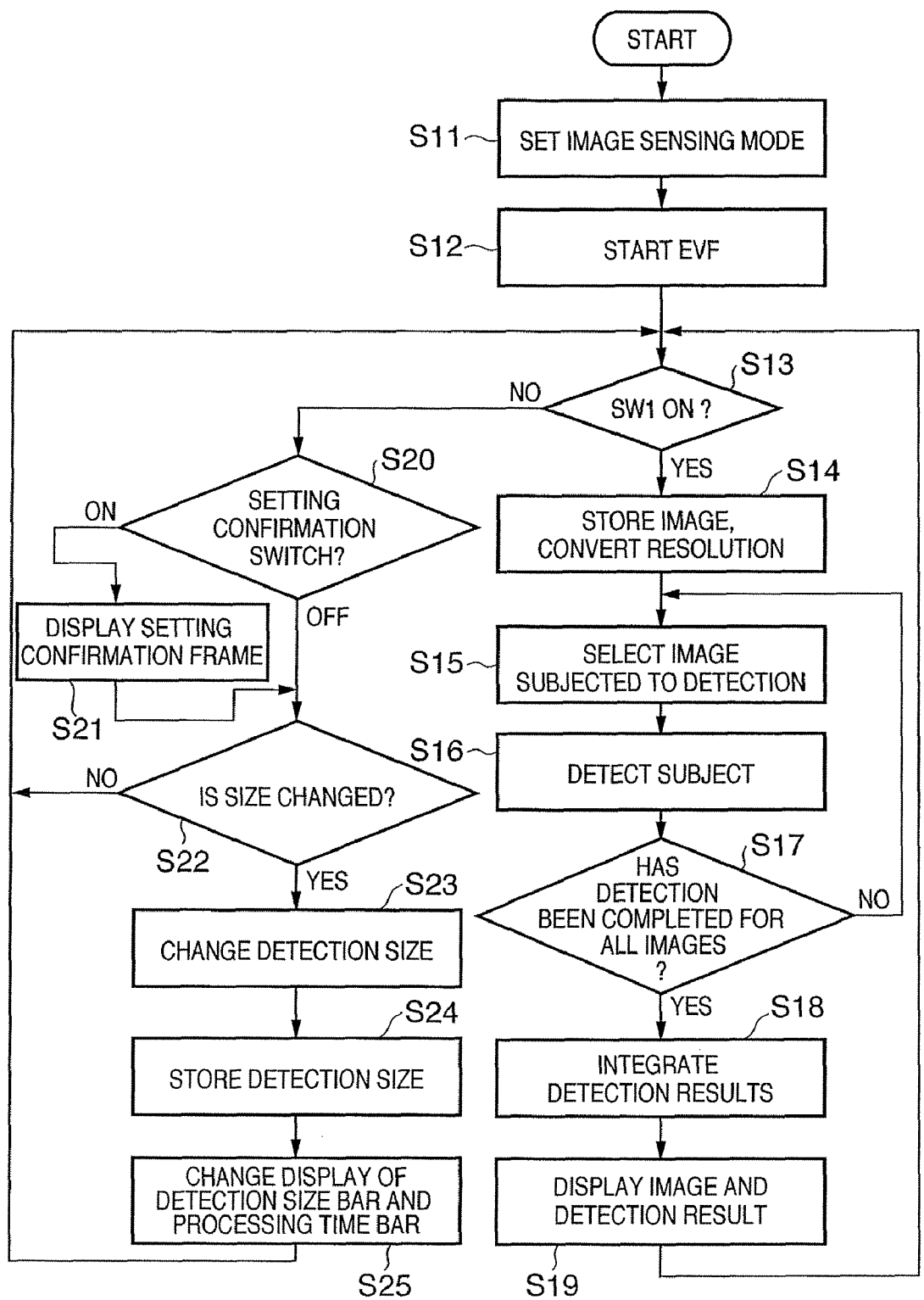
FIG. 2 is a flowchart showing a subject detection operation according to the first embodiment of the present invention.

Next, with reference to a flowchart of FIG. 2, a subject detection operation in the image sensing apparatus according to the first embodiment will be described. The process shown in FIG. 2 is basically controlled by the control unit 101.

First, when an image sensing mode is set by a user at step S11, a function of an Electrical View Finder (EVF) is started at step S12. The EVF function is realized by sensing images periodically at intervals of predetermined time by the image sensing unit 102 to generate a moving image, and displaying the images on the display unit 113 via the display circuit 112.

At step S13, it is determined whether or not where SW1 is On, which is a condition where an image sensing preparation has been instructed in response to, for example, a half stroke of the shutter switch 110. If SW1 is On, the process proceeds to step S14. If SW1 is Off, the process proceeds to step S20.

At step S14, the image which has been sensed by the image sensing unit 102 when SW1 has become On or immediately after then, is stored in the memory 111, and concurrently in the image conversion unit 105, the resolution of the input image is converted based on the detection size stored in the detection size storage unit 107. The resolution-converted image is stored in the subject detection memory 104.

Here, the resolution conversion process performed in the image conversion unit 105 at step S14 will be described.

Figure 4A:
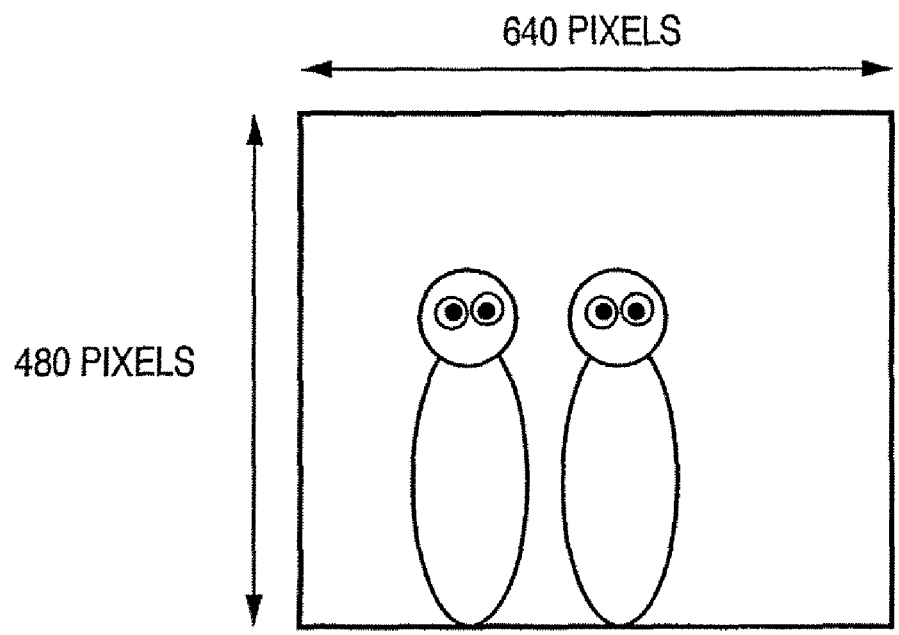
FIGS. 4A and 4B are diagrams for illustrating a resolution conversion.
Figure 4B:
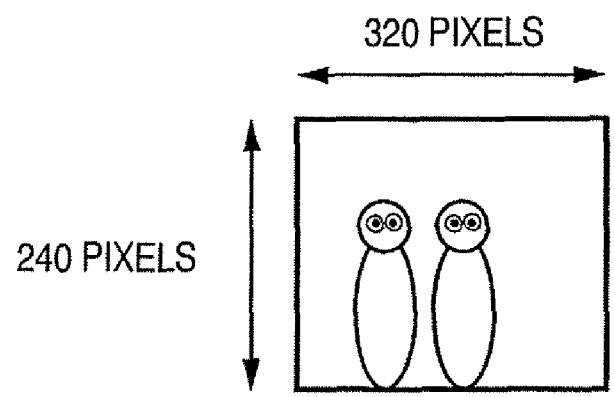

It should be noted that, in this resolution conversion process, unless otherwise noted, "the resolution is set to ½" means that the resolution is set to ½ both in the horizontal direction and the vertical direction. For example, if the resolution of an image of a resolution of 640×480 pixels as shown in FIG. 4A is changed to ½, this image becomes an image of a resolution of 320×240 pixels as shown in FIG. 4B.

As described in the background of the invention, there are many detection processing methods of detecting the subject in the image. However, in every method, there is a minimum limit in the resolution for detecting an object. This minimum resolution depends on each processing method, and in a method described in "Neural Network-Based Face Detection", H. A. Rowley, S. Baluja, T. Kanade, 1996, Computer Vision and Pattern Recognition (CVPR '96), for example, a minimum size (resolution) of a detectable face is 20×20 pixels.

Moreover, a detection processing time depends on the resolution of the image subjected to the detection. If the resolution of the image subjected to the detection is high, the processing time increases because the number of clipped areas increases.

Therefore, at step S14, the resolution of the input image is converted so that the detection size stored in the detection size storage unit 107 may become the minimum resolution of the detection method to be used.

Here, let the minimum resolution of the detection method be Q, a resolution conversion ratio be R, and the detection size stored in the detection size storage unit 107 be S. Then, the resolution conversion ratio R is given by:

$$R = Q/S \quad (1)$$

Next, let the converted resolution be A and the resolution before the conversion be B, then the resolution A of the image after resolution conversion is given by:

$$A = B \times R \quad (2)$$

In other words, if the resolution of the input image is 640×480 pixels, the detection size is 60×60 pixels, and the minimum resolution is 20×20 pixels, $$R = 20/60 = \frac{1}{3} \quad (3)$$

$$A = 640 \times (\tfrac{1}{3}) \approx 214 \text{ (pixels) (horizontal direction)} \quad (4)$$

$$A = 480 \times (\tfrac{1}{3}) = 160 \text{ (pixels) (vertical direction)} \quad (5)$$

In other words, in this case, the resolution of the input image of the resolution of 640×480 pixels is converted into 214×160 pixels. As a resolution conversion method, a general method using a linear interpolation or Bicubic can be used. In consideration of an image quality and the processing time, typically the linear interpolation is used.

Figure 15:
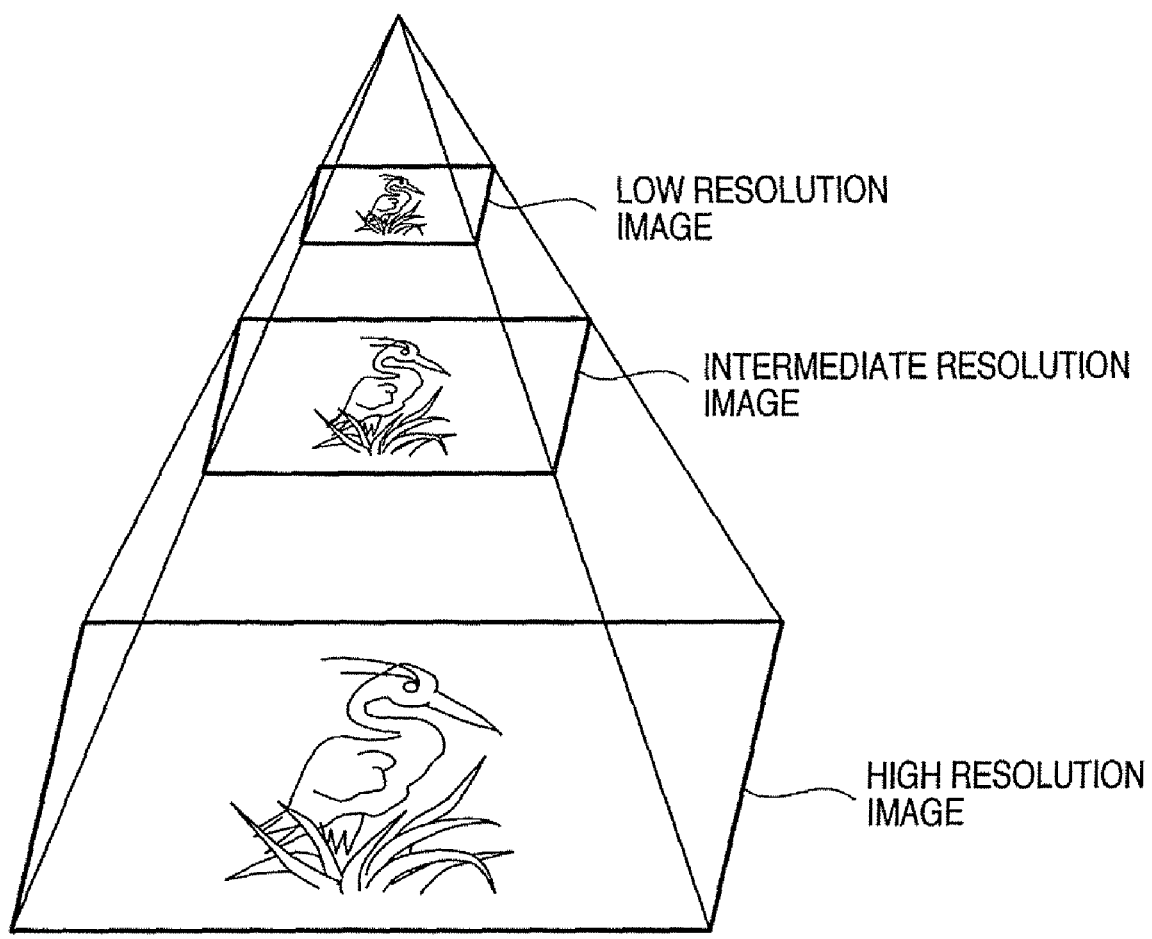
FIG. 15 is a diagram for illustrating conventional pyramid images.

Further continuously, by using this converted image, pyramid images (images of a plurality of different resolutions) are created as described in the background of the invention with reference to FIG. 15. For example, if a detection method having double size robustness is used, the resolution of the image converted into the 214×160 pixels as shown above is converted into 107×80 pixels. Furthermore, the resolution of the image is converted into 54×40 pixels, and into 27×20 pixels. By performing the detection process at step S16 for all of these resolution-converted images, the size of the detected subject may correspond to 60×60 pixels to 480×480 pixels in the input image of the resolution of 640×480 pixels.

It should be noted that in the resolution conversion, when the resolution is converted into the minimum resolution at which the subject can be detected, there may be the case where a detection rate decreases. Therefore, the resolution conversion rate R of the resolution conversion to be performed first may be set as follows:

$$R=Q/S+\alpha \qquad (6)$$

α may be an appropriate positive number. For example, in the above described example, when α is set to 1/15 and R=1/2.5, instead of R=1/3, the resolution of the input image of 640×480 pixels becomes 256×192 pixels after the resolution conversion.

When the above described process at step S14 is completed, the process proceeds to step S15. At step S15, one of the pyramid images stored in the subject detection memory 104 is selected. Among the images to which the detection process has not been performed, the image of the highest resolution or the image of the lowest resolution is selected.

At step S16, the detection process is performed with respect to the image selected at step S15. As introduced in the background of the invention, many detection processing methods have been proposed, and any method may be applied. When the detection process is completed, the number of the subjects in the image, and a position and a size of each subject in the image are obtained as a detection result. It should be noted that the detected position is obtained as a subject position in the input image (in the above described example, the image of 640×480 pixels), by performing a correction associated with the resolution conversion process, with respect to detected coordinates values which have been obtained in the image of that resolution. Also, the size of the subject is similarly applied with the correction associated with the resolution conversion and obtained as the size of the subject occupying in the input image.

At step S17, it is determined whether the detection process has been performed for the images of all of the resolutions stored in the subject detection memory 104. If the detection process has not been completed, the process returns to step S15 to repeat the above described processes, the image of the next resolution is selected and the detection process is performed. If the detection process has been performed for the images of all of the resolutions, the process proceeds to step S18.

At step S18, the detection results obtained with respect to the images of all of the resolutions stored in the subject detection memory 104 are integrated. The integration is performed based on the positions and the sizes in the input image. In other words, when there are a plurality of detection results at near positions and the sizes of these detection results are nearly equal, these detection results are integrated as an identical subject. An average position and an average size of the plurality of detection results are taken as the position and the size of the integrated subject. However, if a plurality of detection results have been obtained in which the positions are near but the sizes are different, the detection size stored in the detection size storage unit 107 is prioritized, and the detection result which is nearest to the detection size is selected.

At step S19, the image stored in the memory 111 is displayed on the display unit 113 via the display circuit 112. Also concurrently, based on the subject detection result integrated at step S18, a detection frame of the size of each subject is displayed at the position of each subject in the image displayed on the display unit 113.

As long as the condition where SW1 is On continues, the process of the above described steps S14-S19 is repeated. In other words, while in the condition where SW1 is On, the processing time of a subject detection process decides a display rate of the EVF. In this way, by reducing the processing time as much as possible in the subject detection, usability for the user improves.

Figure 5:
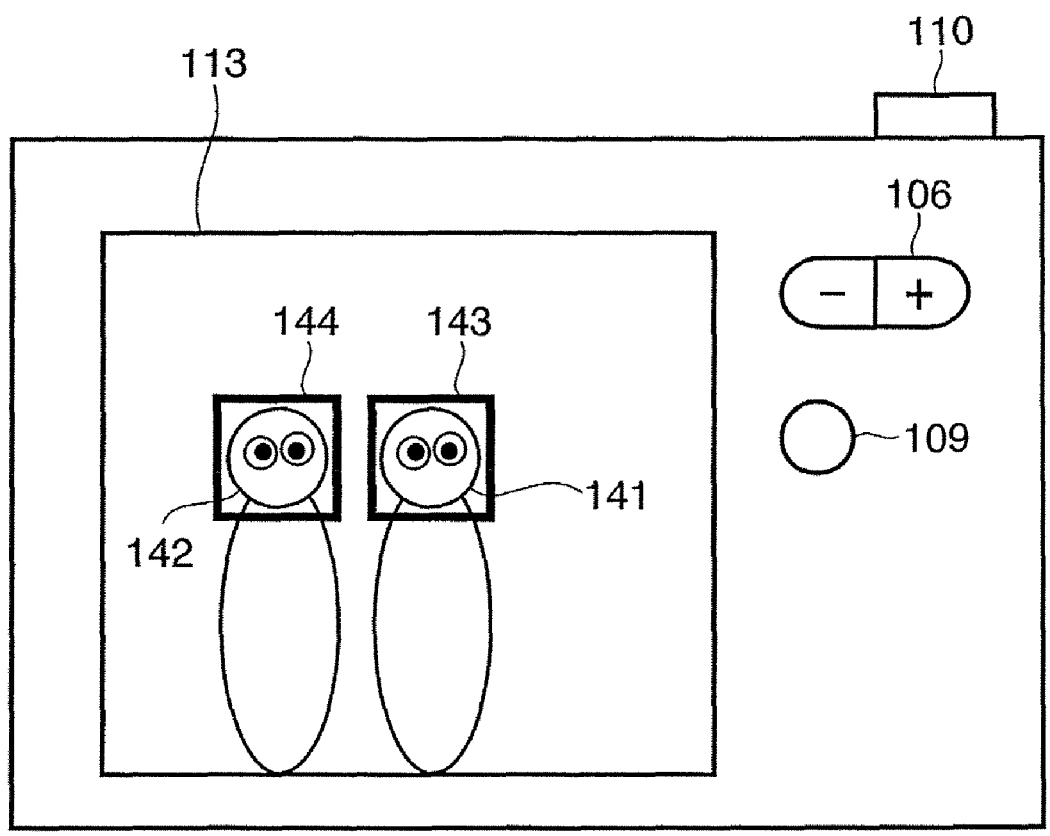
FIG. 5 is a diagram showing a display example of a result of subject detection according to the first embodiment of the present invention.

FIG. 5 shows a schematic diagram of the image displayed on the display unit 113 when the subject is detected in the condition where SW1 is On. In FIG. 5, reference numerals 141 and 142 denote subjects, and reference numerals 143 and 144 denote the detection frames for the detected subjects.

On the other hand, at step S13, if SW1 is not On, the process proceeds to step S20.

Figure 6:
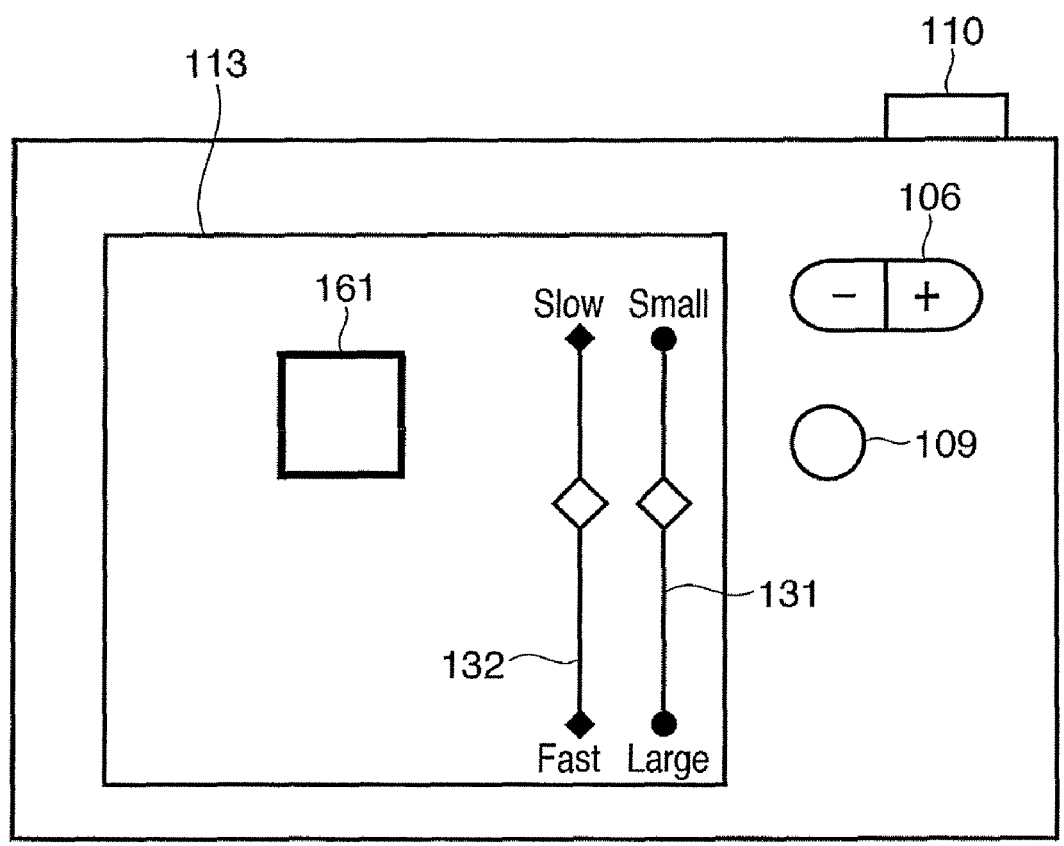
FIG. 6 is a diagram showing a display for confirming a setting according to the first embodiment of the present invention.

At step S20, it is determined whether the setting confirmation switch 109 is On or Off. If the setting confirmation switch 109 is On, the process proceeds to step S21. At step S21, the detection size stored in the detection size storage unit 107 is obtained. As shown in FIG. 6, together with the detection size display bar 131 and the processing time display bar 132, a detection size confirmation frame 161 corresponding to the obtained detection size is displayed on the display unit 113. It should be noted that, since this confirmation frame 161 is displayed so that the user can easily understand the size of the subject to be detected, if the subject is a face for example, the CG of the face and the like may be displayed instead of the confirmation frame 161.

At step S22, with an operation on the detection size operation unit 106 by the user, it is determined whether a change in the detection size has been instructed. If the change has not been instructed, the process returns to step S13 and the above described processes are repeated. If the change has been instructed, the process proceeds to step S23.

At step S23, the detection size stored in the detection size storage unit 107 is obtained. If the detection size operation unit 106 has been operated to enlarge the size, a predetermined value is added to the detection size. If the detection size operation unit 106 has been operated to reduce the size, the predetermined value is subtracted from the detection size. At this time, the addition or the subtraction is performed such that the detection size falls within a predetermined range prescribed by a detection performance of the adopted detection processing method. In other words, as described above, the detection with the detection size of the resolution which is less than or equal to the minimum limit of the adopted detection processing method (in the above described example, less than 20×20 pixels), or of the resolution which is more than the resolution of the input image (in the above described example, more than 480×480 pixels) is impossible. Thus, the detection size is limited to fall within the predetermined range of a detectable size. Specifically, if it is instructed to reduce the size when the set detection size is 20×20 pixels, and if it is instructed to enlarge the size when the set detection size is 480×480 pixels, the instruction is not executed.

At step S24, the changed detection size is stored in the detection size storage unit 107.

Subsequently at step S25, based on the detection size which has been newly stored in the detection size storage unit 107, the display of the detection size display bar 131 is updated. Furthermore, the approximate processing time at the detection size is calculated in the processing time calculation unit 108, and the display of the processing time display bar 132 is updated. In other words, when the detection size is changed, the detection size display bar 131 is changed, and in conjunction with it, the display of the processing time display bar 132 is changed. Thus, it is possible for the user to set a desired detection size and understand a rough indication of the processing time with that detection size. Therefore, it is also possible to change the detection size in order to set the desired processing time. It should be noted that if the setting confirmation switch is On, the size of the detection size confirmation frame 161 is updated and displayed depending on the changed detection size at step S25.

Next, the calculation method for the approximate processing time will be described below.

As described in the background of the invention, generally the detection process is performed by clipping an area of a specific size from the image, comparing and investigating a feature of the pattern of the area and a feature of an object pattern. If the detection processing time per one clipped area is constant, the total detection processing time is in proportion to the number of clipped areas. In other words, the total detection processing time is in proportion to the resolution of the image converted at step S14. However, among the detection processing methods, there are a method of first checking a frequency of each clipped area, and if the frequency of the clipped area is low, determining that the area does not include a desired subject. Further, as a similar method, there is a method of cascade-connecting weak discriminators, in which it takes more processing time if the area is similar to the desired subject, and the like. In these methods, it cannot be said that the detection processing time per one area is constant for all of the clipped areas. However, when an average value of the processing time per one area is obtained by using a large amount of, that is, tens of thousands of images, the average value becomes a value in which even a distribution of existences of low frequency areas or the areas similar to the subject in those images has been considered. The processing time predicted from the value which has been obtained by using a large amount of data in this way, shows a precision which is enough to be used as the rough indication of the processing time. In this way, it is possible to predict a rough processing time from the average value of the processing time per one area which has been obtained from the large amount of data, and the number of the areas which can be clipped from the converted image.

Moreover, as shown in the background of the invention, depending on positional robustness of the adopted detection method, an amount of displacement of a clipping position varies.

From the above description, let the minimum resolution of the used detection method be Q, the resolution of the image after the resolution conversion be Bs, the average value of the processing time per one area be C, the displacement amount of the clipping position be D, and the rough processing time per one image after the resolution conversion be Ts, then the rough processing time Ts is given by:

$$Ts = C \times (Bs/D - Q + 1) \quad (7)$$

For example, when the minimum resolution Q=20×20 pixels, the resolution of the converted image Bs=256×192 pixels, the average value of the processing time per one area C=1 μsec, and the displacement amount D is 2, the rough processing time Ts is given as:

$$Ts = 1 \ \mu sec \times \{(256/2 - 20 + 1) \times (192/2 - 20 + 1)\} \approx 84 \ msec \quad (8)$$

Since the rough processing time Ts as shown above is the processing time with respect to the image of one resolution among the images of the plurality of different resolutions, it is possible to estimate the rough processing time with respect to the images of all of the resolutions by adding the processing time for the image of each resolution. In other words, a rough processing time T taken for the detection process with respect to all of the images of the plurality of resolutions is given by the following expression (9):

$$T = \Sigma Ts \quad (9)$$

It should be noted that the minimum resolution of the detection method Q, the average value C of the processing time per one area, and the displacement amount D of the clipping position depend on the detection method and are known. Therefore, by providing a table for obtaining the resolution Bs of the image after the resolution conversion with the detection size, the input image, and the resolution conversion ratio for creating the pyramid images being input values and the detection processing time being an output value, it is possible to obtain the rough processing T can be searched from this table. This makes it unnecessary for the processing time calculation unit 108 to calculate the above calculation each time.

Figure 7A:
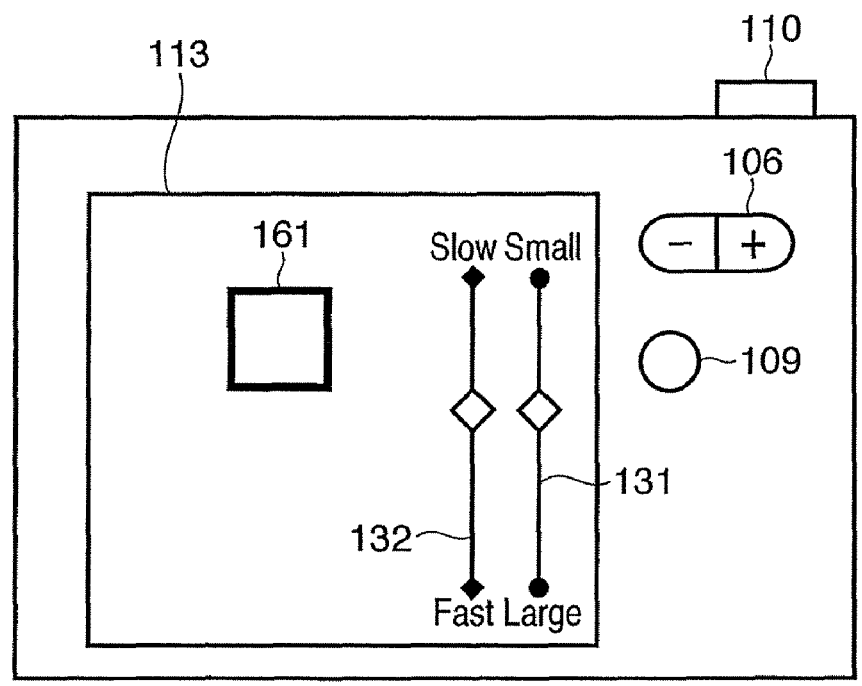
FIGS. 7A and 7B are diagrams showing transition of the display for confirming the setting associated with an operation by a detection size operation unit.
Figure 7B:
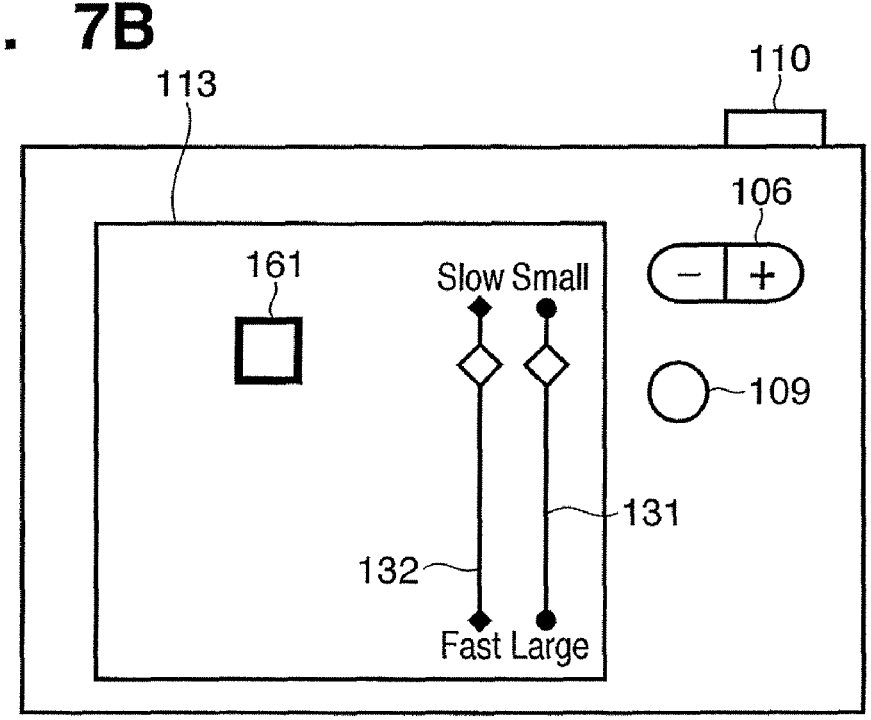

FIGS. 7A and 7B show changes in the display on the display unit 113 when the operation by the detection size operation unit 106 is performed. It should be noted that the setting confirmation switch 109 is set to On, and the detection size which is currently set is displayed as the confirmation frame 161 in FIG. 7A. In contrast to FIG. 7A, FIG. 7B shows a result of operating the detection size operation unit 106 to reduce the detection size. In FIG. 7B, a tab mark indicating the current detection size on the detection size display bar 131 has moved toward a small value (Small), and a tab mark indicating the current processing time on the processing time display bar 132 has moved to increase the processing time (Slow). FIG. 7B further shows that the size of the confirmation frame 161 has become small. In this way, by having the detection size display bar 131 and the processing time display bar 132 operate in conjunction with each other, it is possible to easily understand that when the detection size is changed, also the processing time is changed.

According to the first embodiment as described above, by operating the detection size operation unit 106 to specify the detection size by the user, it is possible to realize reducing the processing time while detecting the subject of the size to be detected. Moreover, by displaying the detection size in a two-dimensional way, a user can easily understand the detection size, and thereby to set the detection size to a desired size. Furthermore, it is possible to set the detection size within a range in which the subject can be detected. Moreover, since the detection size and the processing time are changed in conjunction with each other, a user can easily understand a relation between the detection size and the processing time.

Although it has been described that the pyramid images are created in the resolution conversion process at step S14 in FIG. 2, it should be noted that the image may be converted into only one resolution, instead of the images of the plurality of different resolutions. In other words, the image may be converted based on the detection size stored in the detection size storage unit 107, and after that, the image of a different resolution may not be created.

As described above, when the detection process is performed by using the image of only one resolution, it is not possible to detect the subject of a size different from the detection size stored in the detection size storage unit 107, beyond the size robustness of the adopted detection processing method. However, as the detection processing time is reduced, it is also possible to reduce erroneous detections.

Figure 8A:
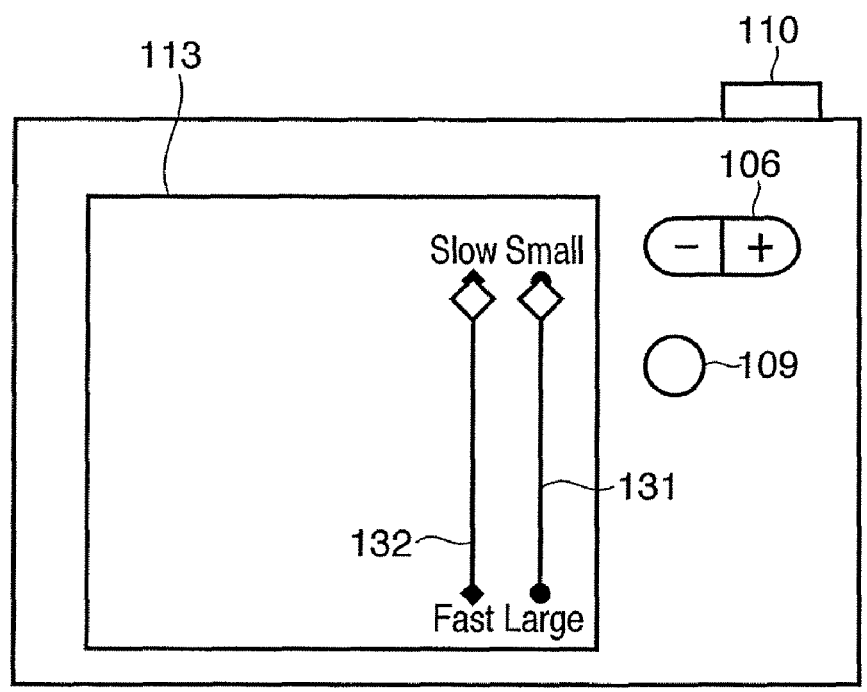
FIGS. 8A and 8B are diagrams showing the displays at the time of a subject detection non-execution mode.
Figure 8A:
Figure 8B:
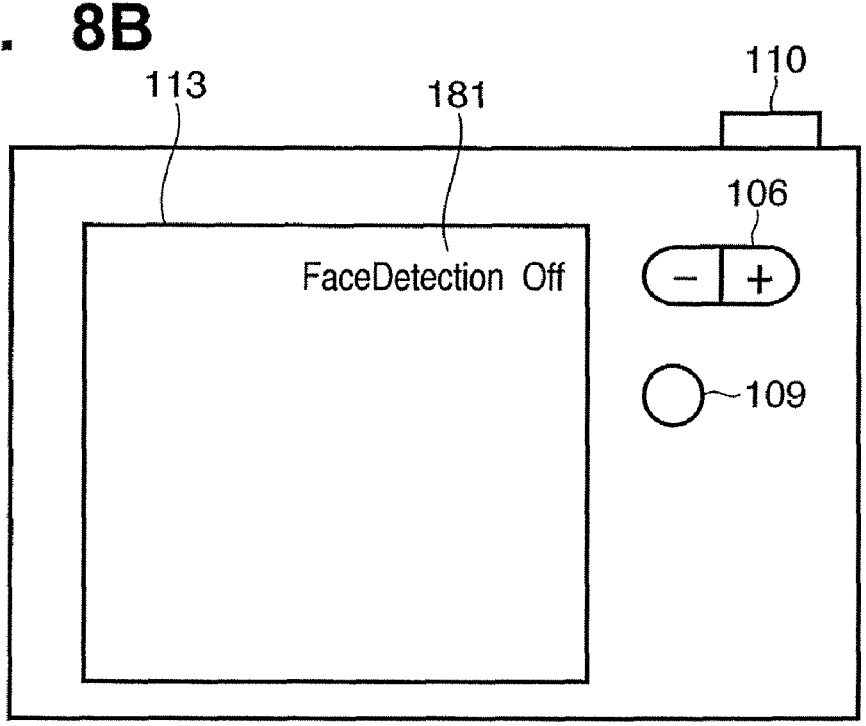

Moreover, although the detection size is limited to fall within the detectable predetermined range at step S23 in FIG. 2, this limitation may not be performed. In that case, the subject detection process may not be performed when the changed detection size becomes out of the predetermined range, and that effect may be displayed. FIGS. 8A and 8B show display examples at this time. FIG. 8A shows the time when the tab mark indicating the detection size displayed on the detection size display bar 131 is at the smallest position. If the detection size operation unit 106 is operated for more than or equal to a predetermined time to further reduce the detection size, the process shifts to a subject detection non-execution mode in which the subject detection process is not performed. When it is in the subject detection non-execution mode, as shown in FIG. 8B, the detection size display bar 131 and the processing time display bar 132 are not displayed on the display unit 113, and a display 181 for indicating the subject detection non-execution mode is performed.

Second Embodiment

Next, the second embodiment of the present invention will be described.

In this second embodiment, the resolution conversion, which is performed by the image conversion unit 105 in the first embodiment, is performed with a fixed resolution. In other words, mainly, in this second embodiment, the process at step S14 of the flowchart shown in FIG. 2 is different from that of the first embodiment. Since other processes and the configuration of the image sensing apparatus are similar to those described in the first embodiment, the description thereof is omitted here.

Figure 9:
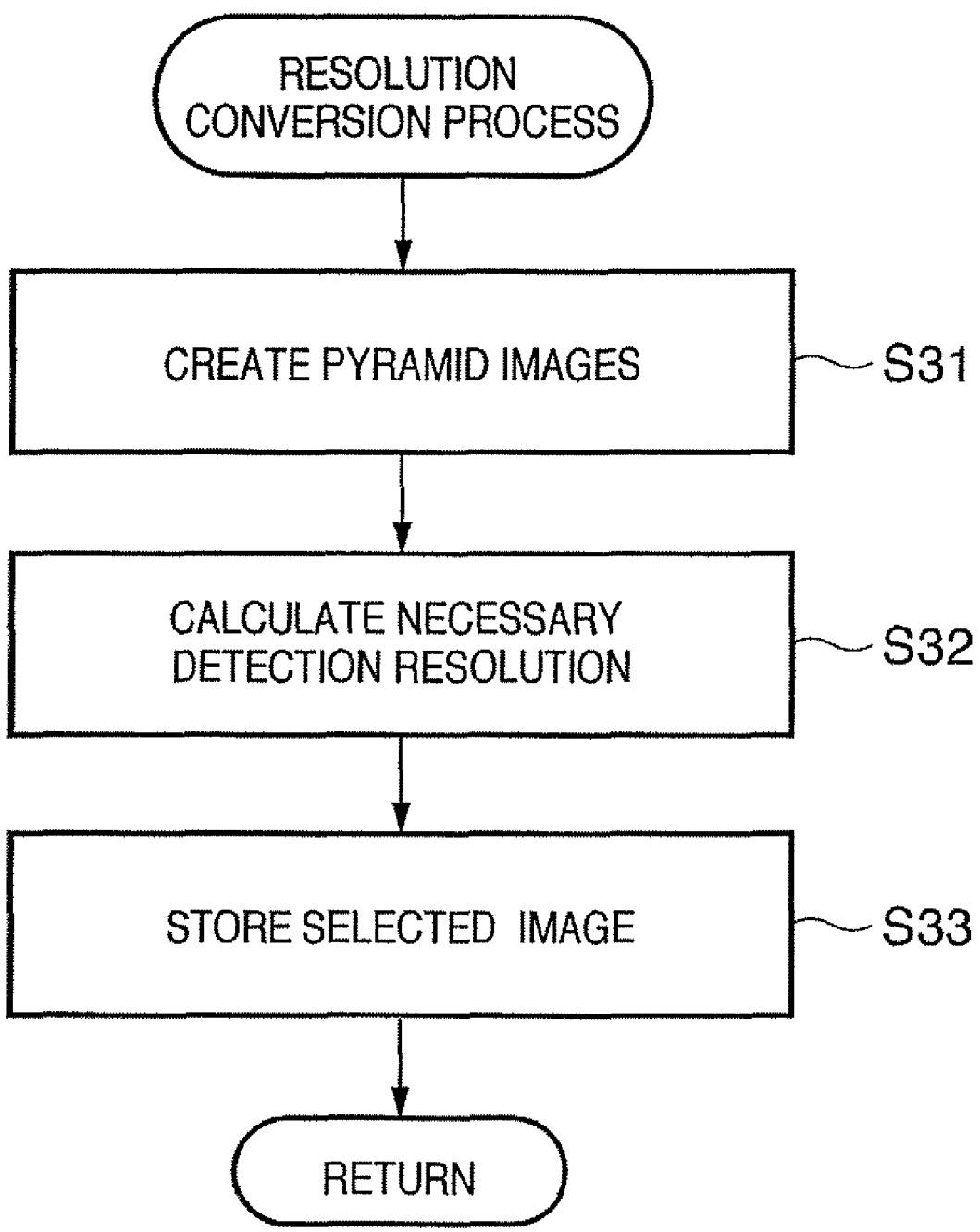
FIG. 9 is a flowchart for illustrating a resolution conversion process according to a second embodiment of the present invention.

Hereinafter, the resolution conversion process performed at step S14 in the second embodiment will be described with reference to a flowchart shown in FIG. 9.

In the second embodiment, at step S14, three processes of creating the pyramid images, calculating a necessary detection resolution, and storing an image selection are performed.

First, at step S31, the resolution conversion ratio is set based on the size robustness of the adopted detection method. The resolution of the input image is converted sequentially with that conversion ratio, and the pyramid images are created.

Here, let the resolution conversion ratio be Rf, the resolution after the conversion be A, and the resolution before the conversion be B, then the resolution A is given by:

$$A = B \times Rf \quad (10)$$

This resolution conversion is repeated until the minimum resolution of the detection method to create the pyramid images.

For example, if the resolution of the input image is 640×480 pixels, the size robustness of the detection method is double, and the minimum resolution is 20×20 pixels, the resolution A becomes as follows:

$$Rf = \tfrac{1}{2} \quad (11)$$

$$A = 640 \times (\tfrac{1}{2}) = 320 \text{ (pixels) (horizontal direction)} \quad (12)$$

$$A = 480 \times (\tfrac{1}{2}) = 240 \text{ (pixels) (vertical direction)} \quad (13)$$

Then the images of 160×120 pixels, 80×60 pixels and 40×30 pixels are created in turn.

Next, at step S32, the resolution required for detecting the subject of the detection size stored in the detection size storage unit 107, that is, the necessary detection resolution is obtained. To obtain this resolution, the same method as the method shown in the first embodiment is used.

For example, let the resolution conversion ratio be R, the necessary detection resolution be An, and the resolution of the input image is 640×480 pixels, the detection size is 60×60 pixels, and the minimum resolution is 20×20 pixels, the necessary detection resolution An becomes:

$$R = 20/60 = \tfrac{1}{3} \quad (14)$$

$$An = 640 \times (\tfrac{1}{3}) \approx 214 \text{ (pixels) (horizontal direction)} \quad (15)$$

$$An = 480 \times (\tfrac{1}{3}) = 160 \text{ (pixels) (vertical direction)} \quad (16)$$

In other words, in this case, 214×160 pixels is the necessary detection resolution.

Next, at step S33, the image to be used for the detection is selected, and stored in the subject detection memory 104. Here, among the pyramid images created at step S31, the image of the lowest resolution which is higher than the necessary detection resolution obtained at step S32. For example, in the above described example, 320×240 pixels are selected.

All of the images of the resolutions which are lower than the selected image are stored in the subject detection memory 104. For example, in the above described example, images of 320×240 pixels, 160×120 pixels, 80×60 pixels and 40×30 pixels are stored.

Figure 10:
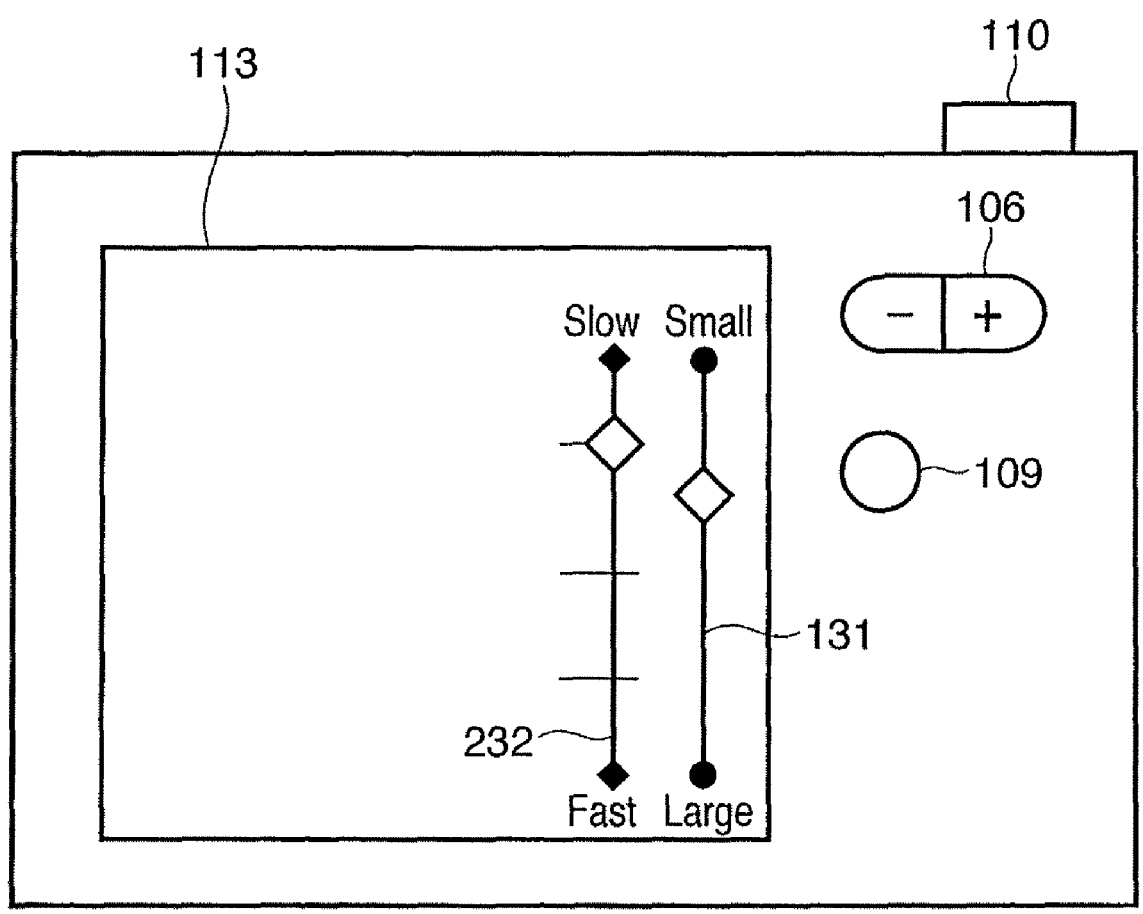
FIG. 10 is a rear view of an image sensing apparatus according to the second embodiment of the present invention.

FIG. 10 shows the rear side of the image sensing apparatus according to the second embodiment. In the second embodiment, when the detection size is changed, the resolution of the image to be used for the detection discretely changes. Thus, the processing time also discretely changes. Therefore, as shown in FIG. 10, a processing time display bar 232 displayed on the display unit 113 is different from that of the first embodiment, and performs a discrete display.

As described above, according to the second embodiment, by performing the resolution conversion process with a fixed conversion ratio, there is an advantage that in the case where the converted image is created using a circuit, it becomes easy to design the circuit.

Third Embodiment

Next, the third embodiment of the present invention will be described.

In the third embodiment, if a zoom control is performed, the detection size is automatically changed in proportion to its zoom amount.

Figure 11:
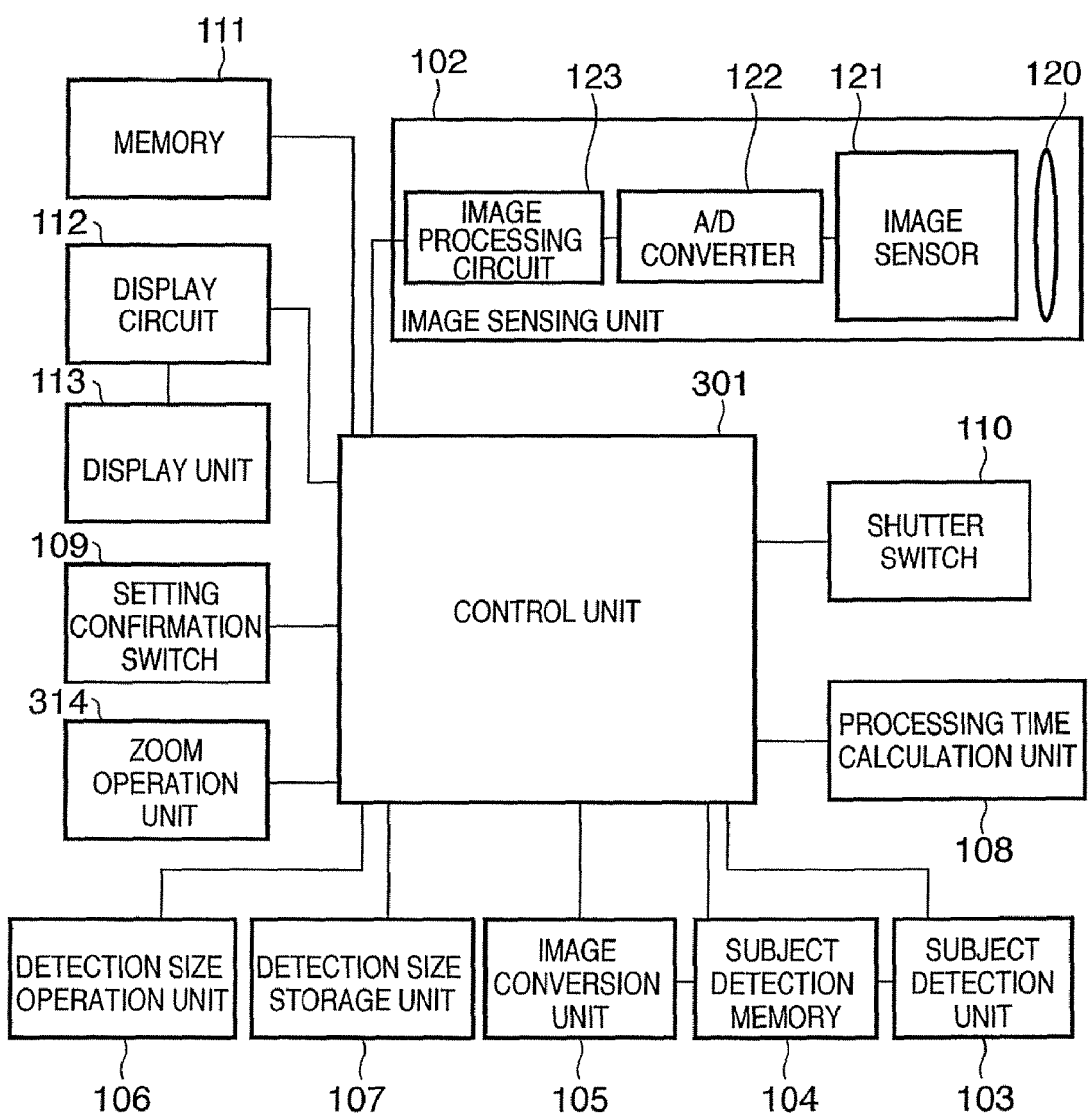
FIG. 11 is a block diagram showing a schematic functional configuration of an image sensing apparatus according to a third embodiment of the present invention.

FIG. 11 is a block diagram showing the configuration of an image sensing apparatus according to the third embodiment. In FIG. 11, the configuration similar to FIG. 1 is referred to by the same reference numeral, and the description thereof is omitted. In comparison to the configuration shown in FIG. 1, a zoom operation unit 314 has been added. By operating this zoom operation unit 314, the image sensing lens 120 in the image sensing unit 102 is controlled to change a zoom magnification.

Figure 12:
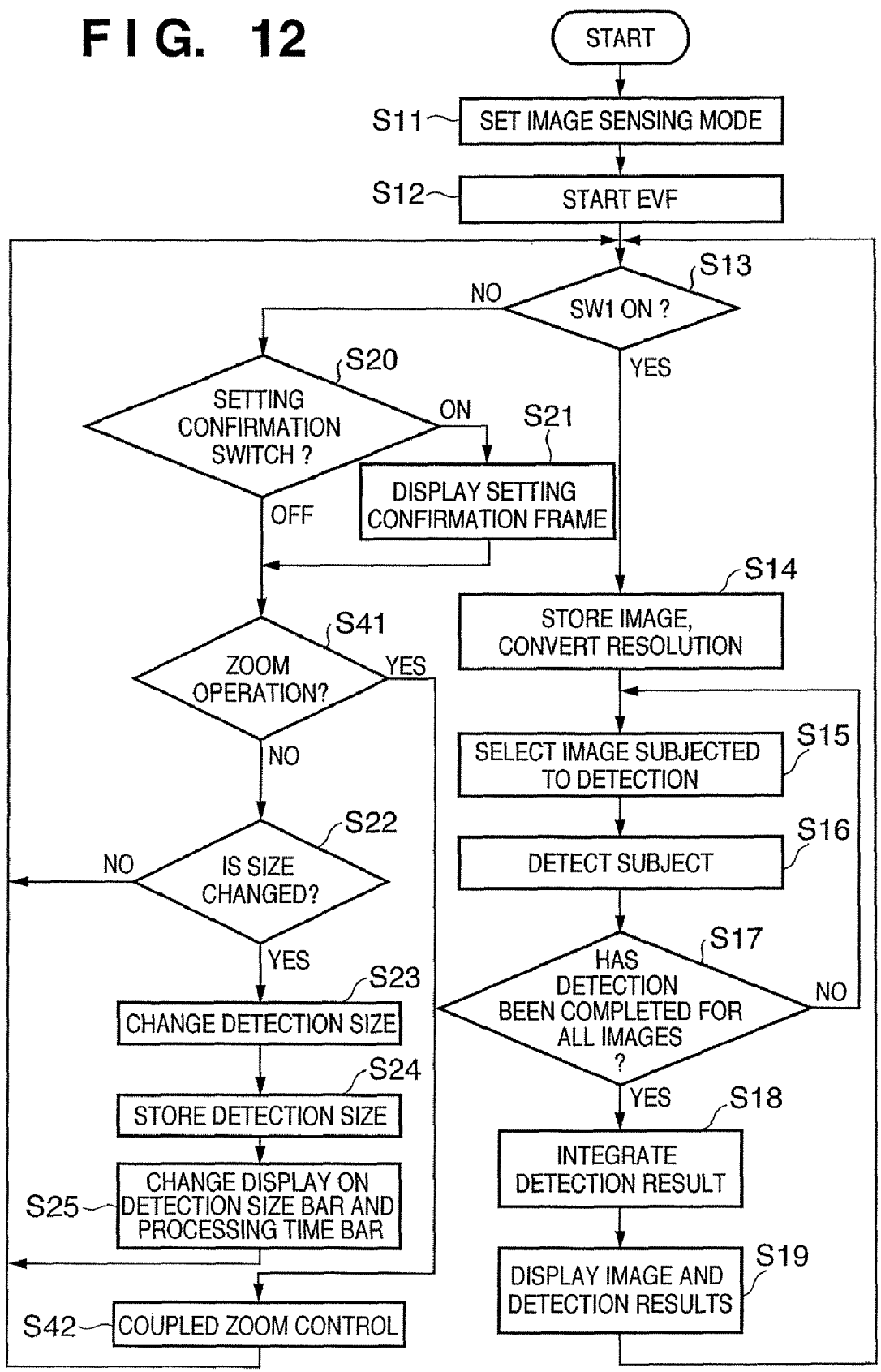
FIG. 12 is a flowchart showing the subject detection operation according to the third embodiment of the present invention.

Next, with reference to a flowchart of FIG. 12, the subject detection operation including the operation on the zoom operation unit 314 will be described. The process shown in FIG. 12 is basically controlled by the control unit 301. It should be noted that in the processes shown in FIG. 12, the similar process as the process described with respect to FIG. 2 is referred to by the same reference numeral, and the description thereof is omitted.

At step S41, it is determined whether the user has operated the zoom operation unit 314. If it is determined that the user has not operated it, the process proceeds to step S22, and then the process as described in FIG. 2 is performed. On the other hand, if it is determined that the user has operated the zoom operation unit 314, the process proceeds to step S42, and a coupled zoom control is performed.

Figure 13:
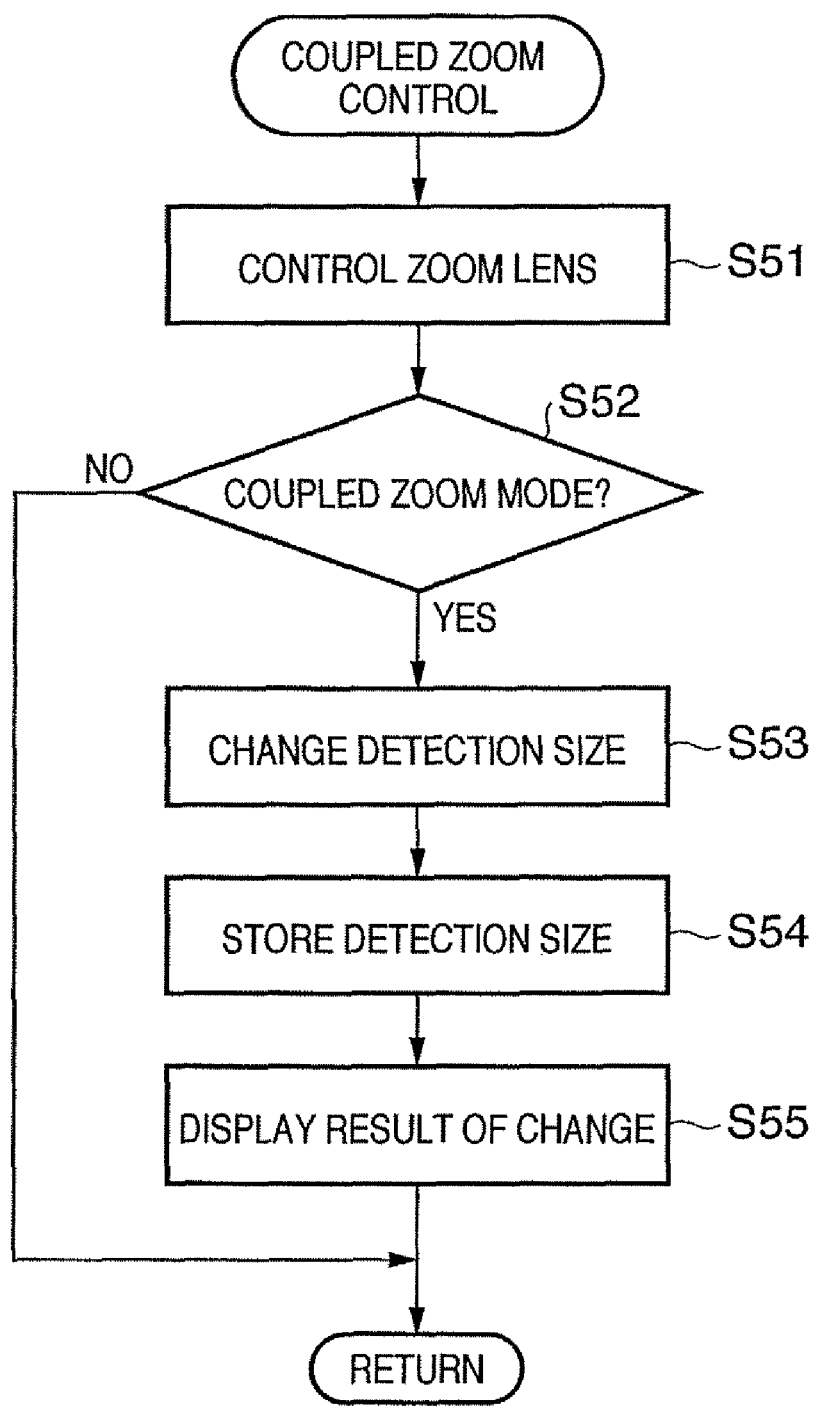
FIG. 13 is a flowchart for illustrating a coupled zoom control process according to the third embodiment of the present invention.
Figure 14:
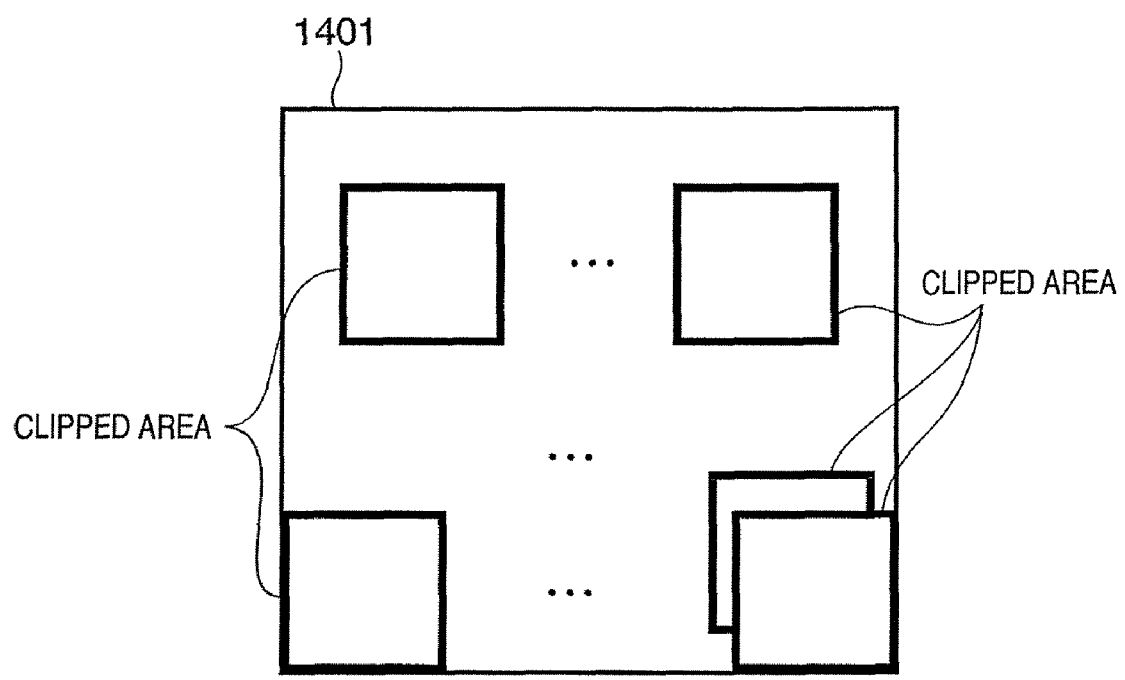
FIG. 14 is a diagram for illustrating conventional clipped areas.

FIG. 13 is a flowchart showing the coupled zoom control process performed at step S42.

At step S51, the zoom amount is set according to the operation on the zoom operation unit 314 by the user, and a zoom lens within the image sensing lens 120 of the image sensing unit 102 is controlled.

Next, at step S52, it is determined whether or not a coupled zoom mode has been set. Here the coupled zoom mode refers to a mode of coupling the zoom control and the detection size. Here the coupled zoom mode is set with a set button not shown, or is set when the subject detection has been performed immediately before. A condition of "the subject detection has been performed immediately before" refers to a condition where SW1 has been set to On and the subject has been detected with the process at steps S14 to S19, within a predetermined time when the zoom operation unit 314 is operated. When the user performs the zoom control immediately after the subject has been detected, it is considered that the user intends to change the size of the subject in the image. Thus, in the third embodiment, if "the subject detection has been performed immediately before", the coupled zoom mode is set.

If the coupled zoom mode is not set, since it is unnecessary to perform the process of more than controlling the zoom lens, the process returns to the flowchart of FIG. 12.

On the other hand, if the coupled zoom mode has been set, the process proceeds to step S53. At step S53, a new detection size is obtained from the detection size stored in the detection size storage unit 107 and a zoom variation. Let the detection size stored in the detection size storage unit 107 before the zoom control be So, the zoom variation be Zv, and the new detection size be Sn, then the new detection size Sn is given by the following equation (17):

$$Sn = So \times Zv \quad (17)$$

For example, when the detection size which has been stored in the detection size storage unit 107 is 48×48 pixels, and a zoom variation ratio is 2.0 times, the new detection size becomes 96×96 pixels. Next, at step S54, the changed detection size is stored in the detection size storage unit 107 again.

At step S55, similarly to the first embodiment, the display on the detection size display bar 131 is changed according to the detection size stored in the detection size storage unit 107. Moreover, the processing time at that detection size is predicted by calculation or using the table, and the display on the processing time display bar 132 is changed.

In this way, in the third embodiment, if the coupled zoom mode has been set, such as if the user has specified or if the subject detection has been performed immediately before the zoom control, the detection size is automatically changed in proportion to a zoom control amount. According to this control, there is an advantage that it becomes unnecessary to change the detection size after the zoom control is completed.

Although the case where the zoom is an optical zoom has been described in the above described third embodiment, it should be noted that it is apparent that the present invention is applicable even to the case of an electronic zoom and the case where both the optical zoom and the electronic zoom are used.

Moreover, although the case where the present invention is applied to the image sensing apparatus has been described in the above described first to third embodiments, it is also possible to apply the present invention to an apparatus for inputting the image externally and detecting the subject in the input image.

Other Embodiments

The invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code installed in the computer also implements the present invention. In other words, the claims of the present invention also cover a computer program for the purpose of implementing the functions of the present invention.

In this case, so long as the system or apparatus has the functions of the program, the program may be executed in any form, such as an object code, a program executed by an interpreter, or scrip data supplied to an operating system.

Example of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Besides the cases where the aforementioned functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2005-256859 filed on Sep. 5, 2005, which is hereby incorporated by reference herein in its entirety.

What is claimed is:

1. An image processing apparatus having an image input unit and a detection unit for performing a process of detecting a predetermined target object in an image inputted from said image input unit, the image processing apparatus comprising:
   a size changing unit that sets a resolution of the target object to be detected by said detection unit;
   a resolution conversion unit that converts a resolution of said input image based on the resolution of the target object set by said size changing unit, wherein said detection unit performs said process of detecting the target object in the image whose resolution has been converted by said resolution conversion unit;
   a processing time acquisition unit that acquires a predicted processing time which is required for detecting the target object by said detection unit, based on the resolution of the target object set by said size changing unit and the resolution of the image which has been converted by said resolution conversion unit; and
   a display unit, wherein the resolution of the target object set by said size changing unit and the predicted processing time acquired by said processing time acquisition unit are displayed on said display unit,
   wherein each time the resolution of the target object is changed by said size changing unit, the display of the resolution of the target object and the predicted processing time is updated.

2. The image processing apparatus according to claim 1, wherein said resolution conversion unit converts said input image into images of a plurality of different resolutions.

3. The image processing apparatus according to claim 1, wherein said resolution conversion unit further limits the resolution to be converted based on size robustness of a detection method adopted by said detection unit.

4. The image processing apparatus according to claim 1, wherein if a plurality of the target objects of different resolutions are detected in near areas in the image by said detection unit, the target object of the resolution which is nearest to the resolution of the target object set by said size changing unit is selected.

5. The image processing apparatus according to claim 1 further comprising:
   a control unit that, when the resolution of the target object is changed by said size changing unit, controls the changed resolution of the target object to fall within a range of size at which the detection process can be performed by said detection unit.

6. The image processing apparatus according to claim 1, wherein if the resolution of the target object set by said size changing unit is out of a range of size at which the detection process can be performed by said detection unit, it is controlled so that the detection process by said detection unit is not performed.

7. The image processing apparatus according to claim 1, further comprising:
   a zoom operation unit used for changing a zoom amount, wherein if said zoom amount has been changed, said size changing unit changes the resolution of the target object in proportion to said zoom amount.

8. An image processing apparatus having an image input unit and a detection unit for performing a process of detecting a predetermined target object in an image inputted from said image input unit, the image processing apparatus comprising:
   a size changing unit that sets a size of the target object to be detected by said detection unit;
   a processing time acquisition unit that acquires a predicted processing time which is required for detecting the target object by said detection unit, based on the size of the target object set by said size changing unit; and
   a display unit that displays the size of the target object set by said size changing unit and the predicted processing time acquired by said processing time acquisition unit,
   wherein each time the size of the target object is changed by said size changing unit, said display unit updates the display of the size of the target object and the predicted processing time.

9. An image processing method, comprising:
   an image input step;
   a detection step of performing a process of detecting a predetermined target object in an image inputted at said image input step;
   a size changing step of setting a resolution of the target object to be detected at said detection step;
   a resolution conversion step of converting a resolution of said input image, based on the resolution of the target object set at said size changing step, wherein said detection step performs said process of detecting the target object in the image whose resolution has been converted at said resolution conversion step;
   a processing time acquisition step of acquiring a predicted processing time which is required for detecting the target object at said detection step, based on the resolution of the target object set at said size changing step and the resolution of the image which has been converted at said resolution conversion step;
   a display step of displaying the resolution of the target object set at said size changing step and the predicted processing time acquired at said processing time acquisition step on a display unit; and
   an update step of, each time the resolution of the target object is changed at said size changing step, updating the display of the resolution of the target object and the predicted processing time.

10. The image processing method according to claim 9, wherein said resolution conversion step converts said input image into images of a plurality of different resolutions.

11. The image processing method according to claim 9, wherein said resolution conversion step further limits the resolution to be converted based on size robustness of a detection method adopted at said detection step.

12. The image processing method according to claim 9, further comprising:
   a step of, if a plurality of the target objects of different resolutions are detected in near areas in the image at said detection step, selecting the target object of the resolution which is nearest to the resolution of the target object set at said size changing step.

13. The image processing method according to claim 9, wherein when the resolution of the target object is changed at said size changing step, the changed resolution of the target object is controlled to fall within a range of size at which the detection process can be performed at said detection step.

14. The image processing method according to claim 9, wherein if the resolution of the target object set at said size changing step is out of a range of size at which the detection process can be performed at said detection step, it is controlled so that the detection process at said detection step is not performed.

15. The image processing method according to claim 9, further comprising:

a step of changing a zoom amount; and a step of, if said zoom amount has been changed, changing the predetermined size in proportion to said zoom amount.

16. An image processing method, comprising:

an image input step;

a detection step of performing a process of detecting a predetermined target object in an image inputted at said image input step;

a size changing step of setting a size of the target object to be detected at said detection step;

a processing time acquisition step of acquiring a predicted processing time which is required for detecting the target object at said detection step, based on the size of the target object set at said size changing step; and a displaying step of displaying the size of the target object set at said size changing step and the predicted processing time acquired at said processing time acquisition step; and an updating step of, each time the size of the target object is changed at said size changing step, updating the display of the size of the target object and the predicted processing time.

17. A non-transitory readable storage medium having stored thereon a program which is executable by an image processing apparatus, the program having a program code for realizing the image processing method according to claim 9.

\* \* \* \* \*